UNITED STATES PATENT OFFICE.

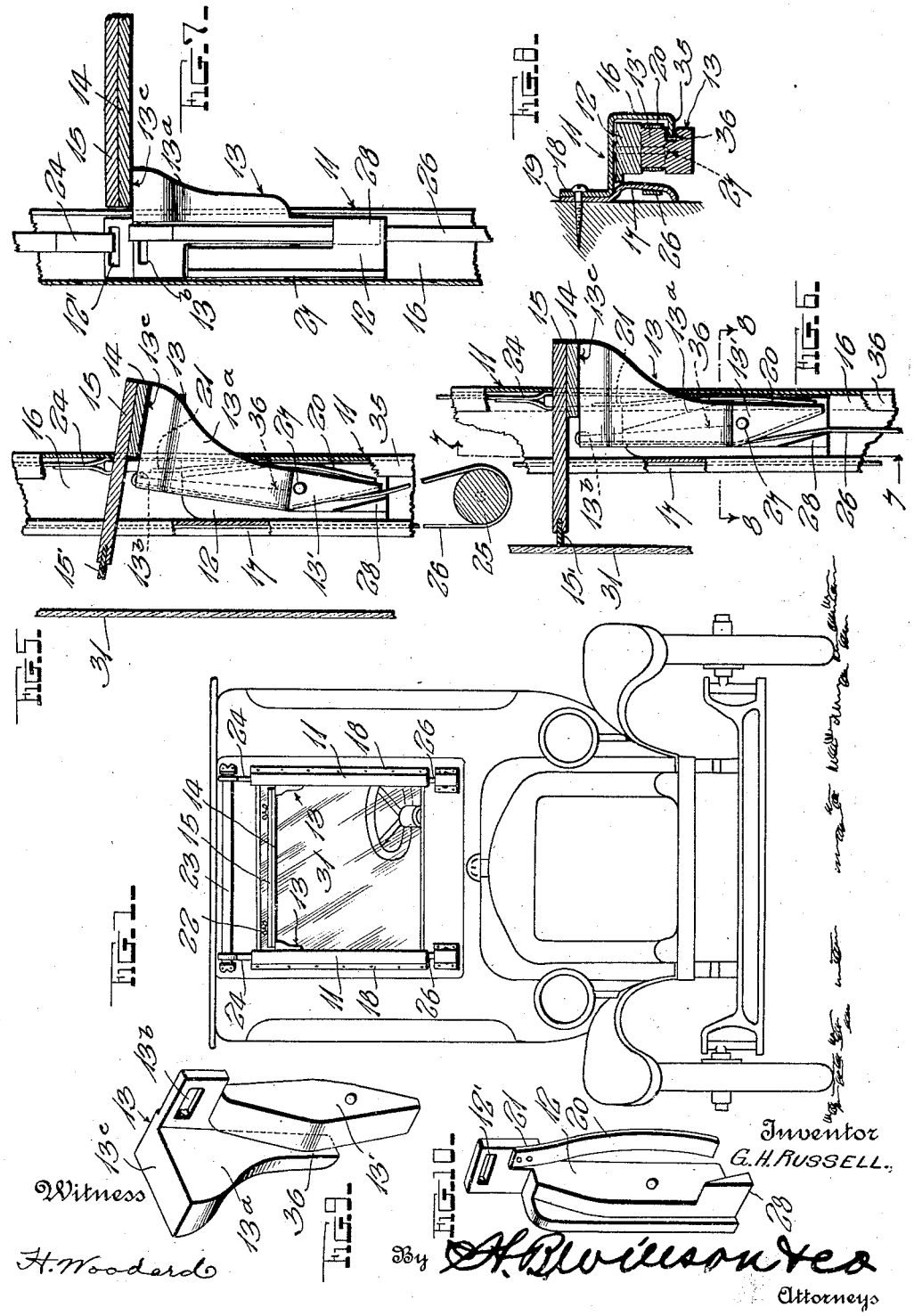

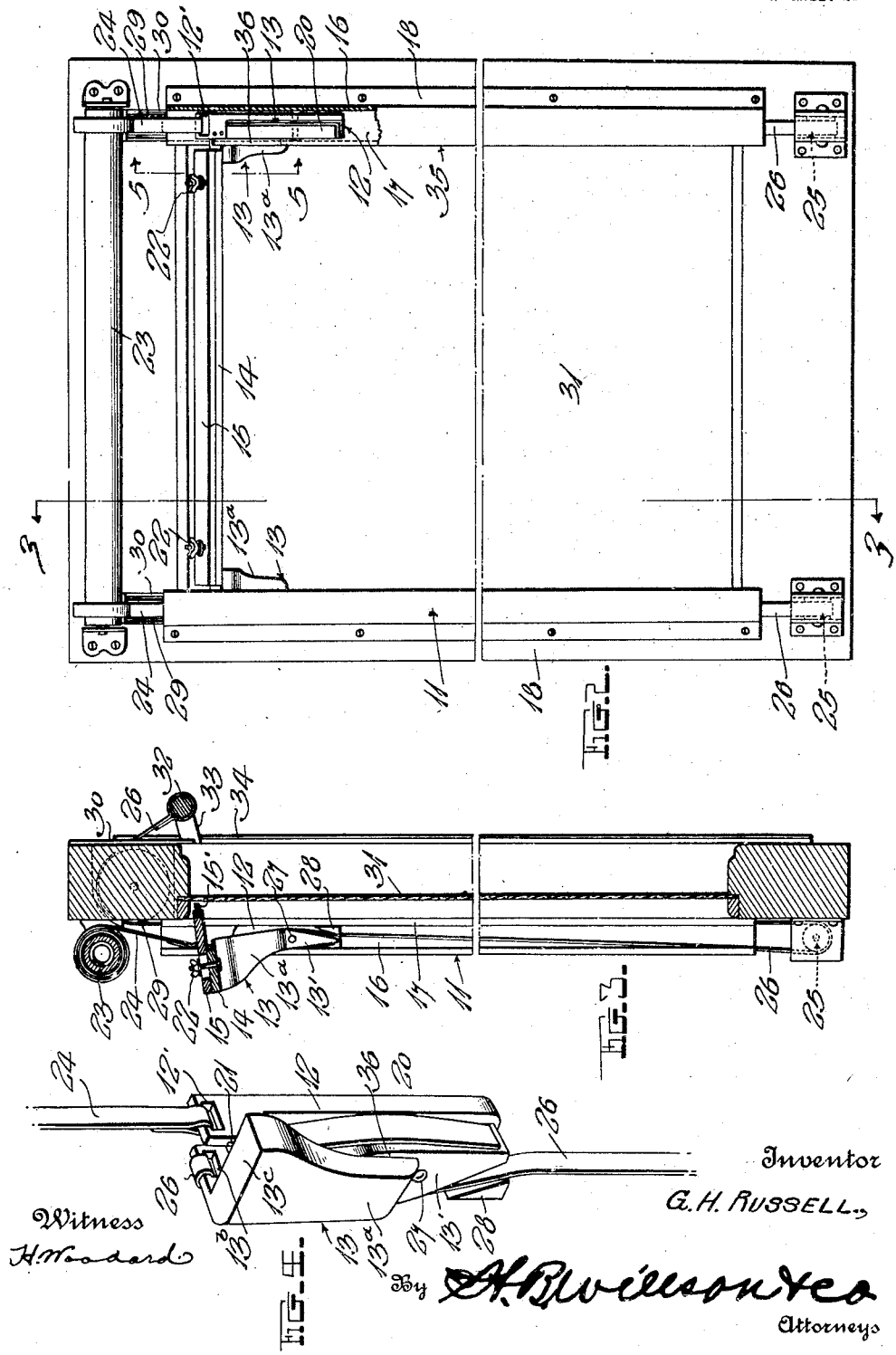

GEORGE H. RUSSELL, OF PITTSFIELD, MASSACHUSETTS.

WINDOW-WIPING DEVICE.

1,340,794.  Specification of Letters Patent.  Patented May 18, 1920.

Application filed March 27, 1919. Serial No. 285,567.

*To all whom it may concern:*

Be it known that I, GEORGE H. RUSSELL, a citizen of the United States, residing at Pittsfield, in the county of Berkshire and State of Massachusetts, have invented certain new and useful Improvements in Window-Wiping Devices; and I do declare the following to be a full, clear, and exact description of the invention, such as will enable others skilled in the art to which it appertains to make and use the same.

This invention relates to window wiping devices, and it relates more specifically to an improved attachment for wiping snow and moisture from windows or automobile wind-shields. The main object of this invention is to generally improve upon devices of this character.

Other objects and advantages may become apparent to persons who read the following details of description in connection with the accompanying drawings, in which:—

Figure 1 is a front elevation of an automobile having my improved wiping device attached to the wind-shield.

Fig. 2 is an enlarged front elevation of the wind-shield, parts being broken out, showing some of the details of my improved wiping device.

Fig. 3 is a vertical sectional view taken along the line 3—3 of Fig. 2.

Fig. 4 is a perspective view of the right-side carrying bar and the contiguous wiper support, which are pivotally connected together.

Fig. 5 is an enlarged vertical sectional detail view, the section being taken along the line 5—5 of Fig. 2, the wiping bar being in its inoperative position.

Fig. 6 is a view similar to Fig. 5 except that the wiping bar is in its operative position.

Fig. 7 is a vertical sectional view along the line 7—7 of Fig. 6.

Fig. 8 is a horizontal sectional view along the line 8—8 of Fig. 6.

Fig. 9 is a perspective view of the right-side wiper support.

Fig. 10 is a perspective view of the right-side carrying bar.

Referring to these drawings in detail, in which similar reference characters correspond with similar parts throughout the several views, and in which the automobile and wind-shield are illustrated merely for the purpose of showing the application of my wiping device, the latter comprises a pair of duplex guides 11, a pair of complemental slides or carrying bars 12, a pair of complemental wiper supports 13, a connecting plate or bar 14, a wiping bar 15, and other elements which will hereinafter be described or referred to.

Each of the duplex guides 11 consists of a main channel 16 and a subsidiary channel 17, the former being provided with an apertured flange 18, and the latter being provided with an apertured flange 19, the apertures of the flanges 18 and 19 being in registry, as illustrated in Fig. 8, so that these two channel members may be united with one another and with a window-sash or other extraneous support by screws or other appropriate means. The channels 16 and 17 of each duplex guide are thus combined to form a housing in which one of the carrying bars 12 and a flat spring 20 are mounted to slide longitudinally, the spring 20 having one end secured to a lateral extension of the bar 12, as indicated at 21. Moreover, the housing or duplex guide also receives an inner portion of the support 13, this inner portion being indicated at 13' in Fig. 9. The inner portion 13' is diamond shaped and is rigidly united with the outer portion 13ª and is provided with an aperture or slot 13ᵇ. To the upper end surface 13ᶜ of each member 13 is secured the connecting plate 14, so that the members 13 are rigidly connected together through the medium of the plate 14. Upon the upper surface of the plate 14 is adjustably secured the wiping bar 15 and the latter preferably comprises a rubber strip 15' which contacts with the window for wiping the same. In Fig. 3 is shown a slot and bolt connection, at 22, by means of which the wiping bar 15 is normally held in fixed relation to the supporting member formed by the united elements 13 and 14. However, by loosening the wing-nut on the bolt, shown at 22, the adjacent slots permit the wiping bar 15 to be adjusted laterally, that is moved toward or from the glass or surface to be wiped. A spring actuated drum or roller 23 is rotatably mounted above the duplex guides, and a pair of straps or flexible elements 24 have their upper ends wound around the spring roller 23, their lower ends being connected, respectively, to the upper ends of the slides or carrying bars 12, the latter being provided with apertures 12' at their upper ends to engage with the respective straps 24, as shown in Fig. 4. It will be seen, therefore, that the spring roller 23 coacts with the straps 24 for supporting the carriers 12, and thereby supporting the elements which the carriers support. Moreover, it will be seen that the spring roller 23 exerts a continual tendency to raise the carriers and their adjuncts from the lower end to the upper end of the duplex guides, and they are operable to thus raise these elements when permitted to do so. However, restraining means are provided as follows:

A pair of wheels or pulleys 25 are journaled in suitable housings below the ends of the respective duplex guides, and tapes or flexible elements 26 extend around these wheels 25 and are connected, respectively, to the apertured portions 13$^b$ of the carriers 13, as shown in Fig. 4. Each of the straps 26 exerts a downward pull on the contiguous support 13 and, at the same time, because of its relation to the pivotal connection 27, the pull of the strap 26 also swings this contiguous support 13 on its pivot 27, it being understood that each strap 26 lies flat against a side of the contiguous support and is the same in effect as if it were connected to the support at a point spaced horizontally from the pivot 27, as clearly shown in Figs. 3, 4 and 7. Each bar 12 is provided with a guiding lug 28 over which the contiguous strap 26 slides.

Referring now to the Figs. 3, 5, 6 and 8, it will be seen that a portion of each strap 26 extends vertically through the subsidiary channel 17 from the contiguous wheel 25 to one of the wheels 29 which are appropriately journaled in a housing 30 above the window-pane or surface to be cleaned, indicated at 31. One end of each strap 26 is secured to a handle-bar 32 which carries brackets 33 at its ends, and these brackets are each slidably engaged with a track or guiding strip 34, as clearly disclosed in Fig. 3.

Referring especially to Fig. 8, it will be seen that each main channel is provided with a flange 35, and that the adjacent support 13 is provided with a groove 36 which receives the flange 35 so as to prevent the united carrying and supporting elements 12 and 14 from becoming disengaged from the main guide or channel. It will be seen moreover, that the channel 16 coöperates with the channel 17 for guiding the members 12 and 13 longitudinally or vertically, and that the horizontal or lateral movement of the supports 13 is limited by their contact with the inner surface of the channel 16.

Normally the carrying bars 12 are disposed at the upper ends of the channels 16 so that the wiping bar 15 is disposed at the top of the window-pane. The springs 20 bearing upon the lower ends of the portions 13' of the supports 13 which are disposed in the channels 16 maintain said supports in such a position that the wiping bar 15 is out of contact with the window-pane. With the parts in this position and it is desired to wipe the window-pane free of water, snow, dirt or the like, the handle-bar 32 is engaged and moved downwardly, its brackets 33 sliding in the guides 34. This downward movement of the handle-bar 32 pulls upon the straps 26 which in turn rock the supports 13 upon their pivots 27, thereby moving the wiping bar 15 into contact with the window-pane and moving it across the latter. When the wiping bar 15 is moved all the way to the bottom of the window-pane the handle-bar 32 is released. As soon as this is done the spring roller 23 will wind the straps 24 thereon and move the bars 12 carrying the supports 13 and wiping bar 15 to the top of the window-pane. The springs 20, as soon as the handle-bar 32 is released, rock the supports 13 upon their pivots so as to move the wiping bar 15 out of contact with the window-pane. The parts remain in this position until the device is again operated.

Although I have described this embodiment of my invention very specifically, it is not intended to limit this invention to these exact details of construction and arrangement of parts, but I am entitled to make changes within the scope of the inventive idea disclosed in the foregoing description and following claims.

What I claim as my invention is:—

1. In a surface wiping device, a pair of guiding channels mounted adjacent the surface to be wiped, a pair of carrying bars slidable in said channels and provided with lateral extensions, a pair of supports having diamond shaped portions pivoted between their ends to said bars, a wiping bar carried by said supports and movable into and out of contact with the surface to be wiped as said supports are rocked upon their pivots, flat springs fastened at one of their ends to the lateral extensions of said bars, said springs being disposed on one of the sides of the diamond shaped portions of said supports and having their other ends bearing against one of the ends of the latter to hold said supports with said wiping bar out of contact with the surface to be wiped, means for moving said bars in said channels and including flexible elements disposed on the other sides of the diamond shaped portions of said supports and secured to the other ends of the latter, and guiding lugs carried by said bars and guiding said elements whereby when the latter are pulled said supports will be rocked on their pivots and said wiping bar will be moved into contact with the surface to be wiped.

2. In a surface-wiping device, a pair of guiding channels mounted adjacent to the surface to be wiped, a pair of carrying bars slidable in said channels, a pair of supports pivoted between their ends to said bars, a wiping bar carried by said supports and movable into and out of contact with the surface to be wiped as said supports are rocked on their pivots, springs carried by said carrying bars and disposed on one of the sides of said supports and bearing against one of the ends of the latter to hold the same with said wiping bar out of contact with the surface to be wiped, means for moving said carrying bars in said channels and including flexible elements disposed on the other sides of said supports and secured to the ends of the latter, and guiding lugs carried by said carrying bars and guiding said elements whereby when the latter are pulled said supports will be rocked on their pivots and said wiping bar will be moved into contact with the surface to be wiped.

3. In a surface-wiping device, a pair of guiding channels mounted adjacent to the surface to be wiped, a pair of carrying bars in said channels respectively, a pair of supports movably secured to said carrying bars respectively, a connecting plate having its ends rigidly united respectively with said supports, and a wiping bar mounted on said connecting plate and being adjustable relative to the plate toward and from the surface to be wiped, said plate and wiping bar being adapted for movement to and from the surface to be wiped, each of said supports having an element engageable with the adjacent channel for limiting said movement, said carrying bars being movable along said guiding channels to cause said wiping bar to wipe said surface.

4. In a surface-wiping device, a pair of duplex guides each comprising a main channel and a subsidiary channel and being supported adjacent to a surface to be wiped, a pair of carrying bars in said main channels respectively, a pair of supports each carried by one of said carrying bars and being movable thereon laterally with relation to said main channels, a wiping bar carried by and movable with said supports so as to be alternately in and out of contact with the surface to be wiped, means to move the carrying bars in one direction along said main channels, flexible elements operable for pulling said carrying bars in the opposite direction along the main channels, wheels around which said flexible elements extend, and an operating member to which each of said flexible elements is secured, a portion of each of said flexible elements between the contiguous wheels extending through one of said subsidiary channels.

In testimony whereof I have hereunto set my hand.

GEORGE H. RUSSELL.

Witnesses:
MARY G. HERRON,
MARY K. MURPHY.